(12) United States Patent
Endo et al.

(10) Patent No.: US 12,088,099 B2
(45) Date of Patent: Sep. 10, 2024

(54) ENERGY MANAGEMENT DEVICE AND ENERGY MANAGEMENT METHOD

(71) Applicant: GS Yuasa International Ltd., Kyoto (JP)

(72) Inventors: Hiroaki Endo, Kyoto (JP); Masao Yokoyama, Kyoto (JP); Shinichi Hongo, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 17/767,264

(22) PCT Filed: Sep. 30, 2020

(86) PCT No.: PCT/JP2020/037140
§ 371 (c)(1),
(2) Date: Apr. 7, 2022

(87) PCT Pub. No.: WO2021/070704
PCT Pub. Date: Apr. 15, 2021

(65) Prior Publication Data
US 2022/0416540 A1    Dec. 29, 2022

(30) Foreign Application Priority Data
Oct. 8, 2019  (JP) ................. 2019-185021

(51) Int. Cl.
*H02J 3/00* (2006.01)
*H02J 3/32* (2006.01)
*H02J 3/38* (2006.01)

(52) U.S. Cl.
CPC .............. *H02J 3/003* (2020.01); *H02J 3/004* (2020.01); *H02J 3/32* (2013.01); *H02J 3/381* (2013.01); *H02J 2300/24* (2020.01)

(58) Field of Classification Search
None
See application file for complete search history.

(56) References Cited

U.S. PATENT DOCUMENTS 11,139,654 B2 * 10/2021 Ghotra .................... H02J 3/381
2014/0236883 A1   8/2014 Ye et al.
(Continued)

FOREIGN PATENT DOCUMENTS

CN      102104251 B     4/2013
JP      2002-171674 A   6/2002
(Continued)

OTHER PUBLICATIONS

International Searching Authority, International Search Report and Written Opinion for International Application No. PCT/JP2020/037140, dated Dec. 28, 2020, (9 pages), Japan Patent Office, Tokyo, Japan.
(Continued)

*Primary Examiner* — Nathan L Laughlin
(74) *Attorney, Agent, or Firm* — Alston & Bird LLP (57) ABSTRACT

The present invention pertains to an energy management device 50 of a microgrid S1 which is associated with a power system 1 and is provided with a power storage device 15, the energy management device calculating a target value of received power of the microgrid, the target value optimizing the utilization efficiency of the energy of the microgrid S1, on the basis of power demand prediction in the microgrid S1 by taking, as constraint conditions, the upper and lower limits of the received power of the microgrid S1 and the upper and lower limits of output power of the power storage device.

20 Claims, 10 Drawing Sheets

(56) References Cited

U.S. PATENT DOCUMENTS

| | | | |
|---|---|---|---|
| 2017/0005473 A1* | 1/2017 | Somani | H02J 3/381 |
| 2018/0225614 A1* | 8/2018 | Bahramirad | G06Q 10/06 |
| 2019/0181644 A1* | 6/2019 | Chae | H02J 3/466 |
| 2019/0340545 A1 | 11/2019 | Minegishi et al. | |

FOREIGN PATENT DOCUMENTS

| | | |
|---|---|---|
| JP | 4765162 B2 | 9/2011 |
| JP | 2012-100504 A | 5/2012 |
| JP | 2014-236541 A | 12/2014 |
| JP | 2015-520599 A | 7/2015 |
| JP | 2017-017792 A | 1/2017 |
| JP | 2018-182847 A | 11/2018 |
| WO | WO-2017/217466 A1 | 12/2017 |
| WO | WO-2020/218191 A1 | 10/2020 |

OTHER PUBLICATIONS

U.S. Appl. No. 17/603,261, Unpublished (filing date: Oct. 12, 2021, (applicant: GS Yuasa International Ltd.).

* cited by examiner

ENERGY MANAGEMENT DEVICE AND ENERGY MANAGEMENT METHOD

CROSS REFERENCE TO RELATED APPLICATIONS

This application is a national stage application, filed under 35 U.S.C. § 371, of International Application No. PCT/JP2020/037140, filed Sep. 30, 2020, which claims priority to Japan Application No. 2019-185021, filed Oct. 8, 2019, the contents of both of which as are hereby incorporated by reference in their entirety.

BACKGROUND

Technical Field

The present invention relates to energy management of a microgrid.

Description of Related Art

Introduction of a distributed power supply typified by a photovoltaic (PV) power generation system has been advanced from the viewpoint of reduction of dependence on a fossil fuel and an environmental problem. A PV system converts power generated by a solar power generation panel from a direct current (DC) to an alternating current (AC) using an inverter circuit of a power control device, and outputs the AC.

Japanese Patent No. 4765162 discloses a technique for controlling second power conversion means such that received power detected by received power detection means does not fall below predetermined power during output of both the generated power of the distributed power supply and the power from power storage means in the power storage type solar power generation system. Thus, the power from the power storage means is prevented from flowing back to a power system.

BRIEF SUMMARY

An object of the present invention is to propose a method for efficiently operating energy in a microgrid connected to a power system.

One aspect of the present invention is an energy management device for a microgrid that is interconnected to a power system and includes an energy storage apparatus, the energy management device calculates a target value of received power of the microgrid, the target value of the received power optimizing energy use efficiency of the microgrid, based on a supply and demand prediction of power in the microgrid with upper and lower limits of received power of the microgrid and upper and lower limits of output power of the energy storage apparatus as constraint conditions. The energy use efficiency means whether the energy can be efficiently used, and an energy saving effect increases as the energy use efficiency increases.

The one aspect of the present invention can be applied to a microgrid energy management method.

The energy can be efficiently operated in the microgrid.

DETAILED DESCRIPTION OF VARIOUS EMBODIMENTS

An energy management device for a microgrid that is interconnected to a power system and includes an energy storage apparatus, wherein the energy management device calculates a target value of received power of the microgrid, the target value of the received power optimizing energy use efficiency of the microgrid, based on a supply and demand prediction of power in the microgrid with upper and lower limits of received power of the microgrid and upper and lower limits of output power of the energy storage apparatus as constraint conditions.

In this configuration, the energy management device can calculate the target value of the received power optimizing the energy use efficiency of the microgrid. The energy management device can optimize the energy use efficiency of the microgrid by causing the received power of the microgrid to follow the calculated target value.

The energy management device may evaluate the energy use efficiency of the microgrid using an objective function. Using the objective function, the energy management device can quantify and objectively evaluate the energy use efficiency.

The objective function may be a function evaluating a use-restricted period of the energy storage apparatus. In this configuration, from the viewpoint of the use efficiency of the energy storage apparatus, the energy management device can optimize the energy use efficiency of the microgrid.

The objective function may be a function evaluating an electricity rate of the microgrid. In this configuration, the energy management device can optimize the energy use efficiency of the microgrid from the viewpoint of the electricity rate of the microgrid.

The objective function may be a function in which a term evaluating the use-restricted period of the energy storage apparatus and a term evaluating the electricity rate of the microgrid are added with weight. In this configuration, the energy management device can optimize the energy use efficiency of the microgrid from two viewpoints of the use efficiency of the energy storage apparatus and the electricity rate of the microgrid. Superiority and inferiority can be decided to the two viewpoints by the way of weighting.

The energy management device may add a condition of a change width of the received power of the microgrid to the constraint condition. In this configuration, the candidate of the target value is narrowed down to the change width of the received power. Thus, the number of arithmetic calculations required to obtain the optimum solution is reduced, and the arithmetic calculation speed can be increased. Because the energy management device can suppress the change in the received power to the change width, the influence on the power system is small and the energy management device is effective for maintaining the quality of electricity.

The energy management device may divide the prediction target period of the target value into a plurality of sections, and calculate the target value of the received power optimizing the energy use efficiency of the microgrid for each of the divided sections. When the prediction target period is divided into the plurality of sections, because the energy management device reduces the number of arithmetic calculations required to obtain the optimal solution as compared with the case where the arithmetic calculation is performed on all the sections, the arithmetic calculation can be accelerated.

The section may be longer than a cycle of the supply and demand prediction. In this configuration, the energy management device can determine the target value of the received power in consideration of the demand prediction of a plurality of cycles.

First Embodiment

1. Description of Microgrid S1

A microgrid S is a small-scale power system linked to a power system 1, and includes at least a distributed power supply, an energy storage apparatus, and a load. The power system 1 may be a power system of a power provider or an independent power system constituted by a self-sustained operation output of a large power conditioner.

Figure 1:
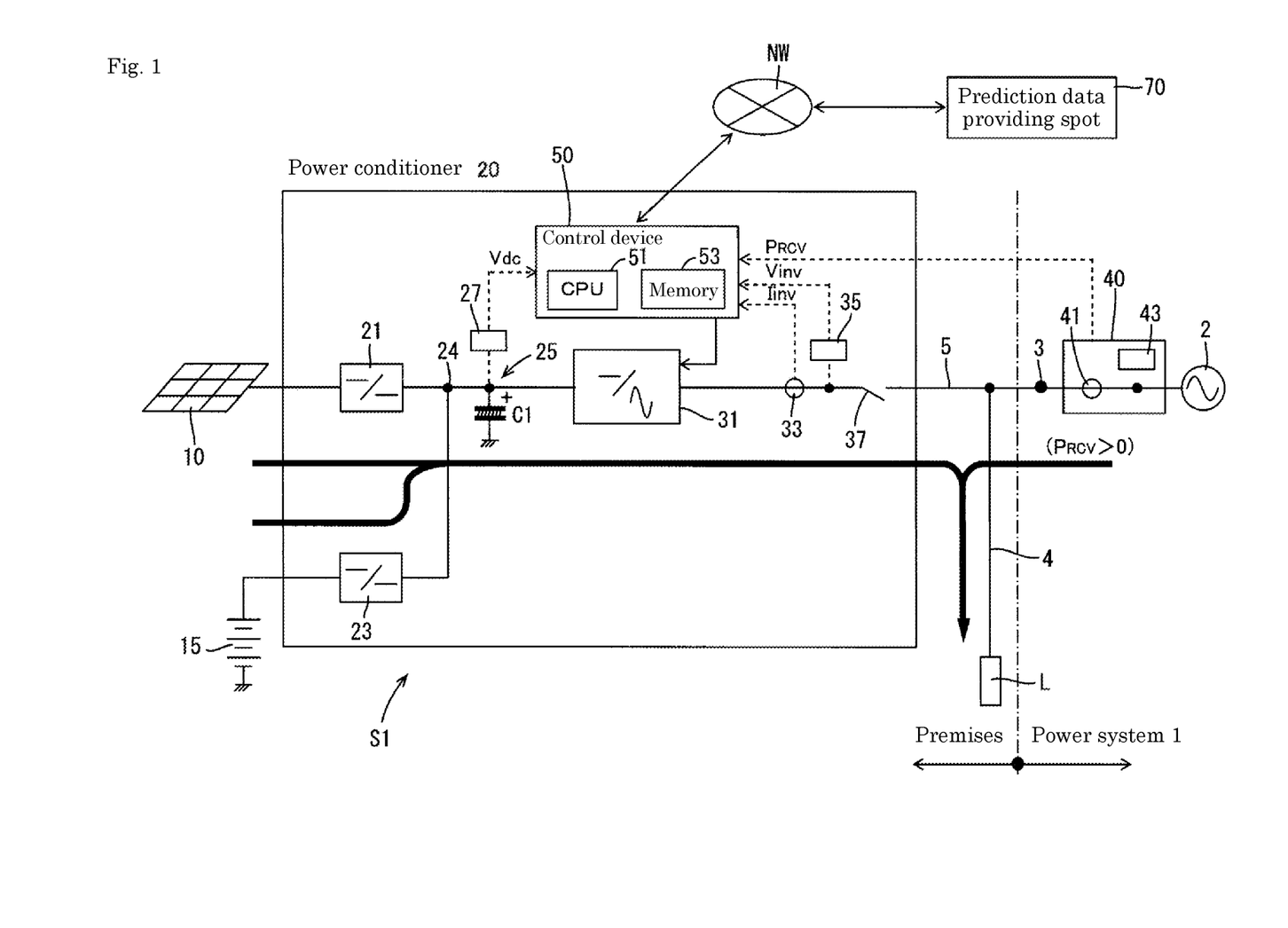
FIG. 1 is a block diagram of a microgrid.

FIG. 1 is a block diagram of the microgrid S1. The microgrid S1 includes a solar power generation panel 10 that is the distributed power supply, a storage battery 15 that is the energy storage apparatus, a power conditioner 20 that is the power control device, and a load L.

The power conditioner 20 includes a first converter circuit 21 that is a first power converter, a second converter circuit 23 that is a second power converter, a DC link unit 25, a bidirectional inverter circuit 31, a relay 37, a control device 50, a DC voltage detection unit 27, an output current detection unit 33, and an output voltage detection unit 35.

The solar power generation panel 10 is connected to the first converter circuit 21. The first converter circuit 21 is a DC/DC converter, and boosts and outputs an output voltage (DC) of the solar power generation panel 10. The first converter circuit 21 may be a chopper.

The storage battery 15 is connected to the second converter circuit 23. For example, the storage battery 15 is a secondary battery. The second converter circuit 23 is a bidirectional DC/DC converter that discharges and charges the storage battery 15. The second converter circuit 23 may be a bidirectional chopper.

The solar power generation panel 10 and the storage battery 15 are connected in parallel to the DC link unit 25 through the first converter circuit 21 and the second converter circuit 23.

The DC link unit 25 is located between a connection point 24 of the converter circuits and the bidirectional inverter circuit 31. An electrolytic capacitor C1 is provided in the DC link unit 25. The electrolytic capacitor C1 is provided so as to stabilize voltage Vdc of the DC link unit 25.

The DC voltage detection unit 27 detects the voltage Vdc of the DC link unit 25. The voltage Vdc of the DC link unit 25 detected by the DC voltage detection unit 27 is input to the control device 50.

The bidirectional inverter circuit 31 is a bidirectional conversion circuit that selectively performs an inverse conversion (inverter) converting the DC into the AC and a forward conversion (converter) converting the AC into the DC. The bidirectional inverter circuit 31 is connected to the DC link unit 25, and converts DC power input from the DC link unit 25 into AC power and outputs the AC power during reverse conversion operation. Particularly, power corresponding to voltage increased from a reference value in the DC link unit 25 by power generation of the solar power generation panel 10 is input to the bidirectional inverter circuit 31. Consequently, the power corresponding to the voltage increased from the reference value is converted from the DC to the AC and output from the bidirectional inverter circuit 31.

The storage battery 15 can store surplus power of the solar power generation panel 10 through the second converter circuit 23. When the generated power of the solar power generation panel 10 is insufficient, the storage battery 15 can compensate for the shortage of the generated power by the discharge through the second converter circuit 23.

The bidirectional inverter circuit 31 is connected to the power system 1 using the system power supply 2 as an AC power supply through a relay 37.

The relay 37 is installed for interconnection with the power system 1. The microgrid S1 can be interconnected to the power system 1 by closing the relay 37.

The output current detection unit 33 detects output current Iinv of the bidirectional inverter circuit 31. The output voltage detection unit 35 is located on an output side of the bidirectional inverter circuit 31, and detects output voltage Vinv of the bidirectional inverter circuit 31.

The output current Iinv of the bidirectional inverter circuit 31 detected by the output current detection unit 33 and the output voltage Vinv of the bidirectional inverter circuit 31 detected by the output voltage detection unit 35 are input to the control device 50. The control device 50 calculates output power (active power) Pinv of the bidirectional inverter circuit 31 based on the output current Iinv and the output voltage Vinv of the bidirectional inverter circuit 31. The output power Pinv is "positive" during the reverse conversion and "negative" during the forward conversion.

The load L that is a demand facility is connected to a power line (trunk line) 5 connecting the bidirectional inverter circuit 31 and the power system 1 through a branch line 4. The power can be supplied to the load L from both the power conditioner 20 and the power system 1.

A power receiving point 3 is a power supply point by the power system 1, and is a boundary portion between the power system 1 and a premises (microgrid S1) as illustrated in FIG. 1.

An external measuring instrument 40 such as an external transducer is provided in the power system 1 as an instrument detecting the power at the power receiving point 3.

The external measuring instrument 40 includes a received current detection unit 41 and a system voltage detection unit 43. The external measuring instrument 40 is installed corresponding to the power receiving point 3, and the received current detection unit 41 detects a received current at the power receiving point 3. The system voltage detection unit 43 detects the system voltage of the power system 1.

The external measuring instrument 40 calculates the received power (effective power) $P_{RCV}$ based on the received current and the system voltage. The received power $P_{RCV}$ detected by the external measuring instrument 40 is input to the control device 50. The received power $P_{RCV}$ can be used to determine the state of a power flow (hereinafter, simply referred to as a flow). The external measuring instrument 40 is a measuring instrument that measures the received power $P_{RCV}$ of the power receiving point 3.

Figure 2:
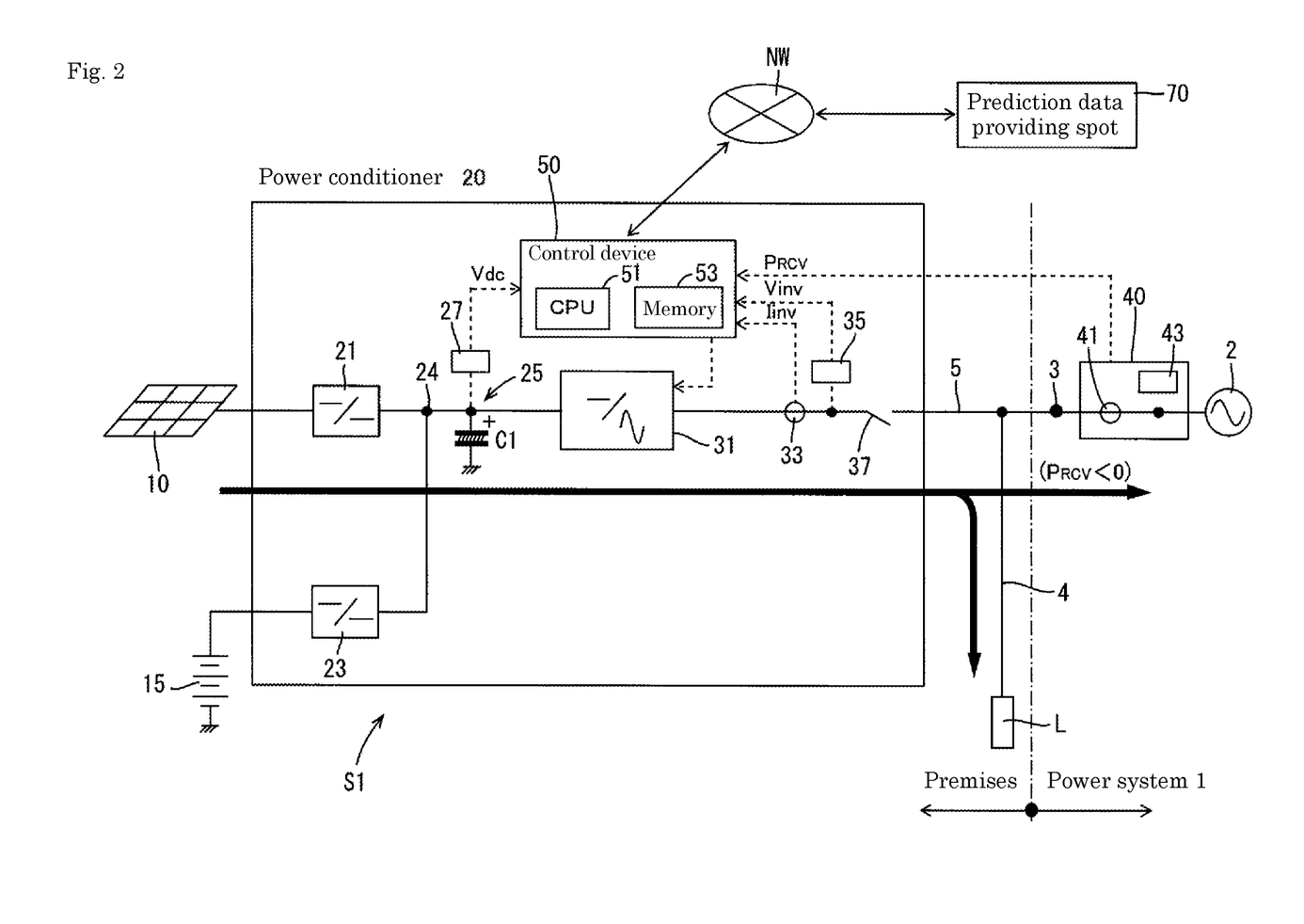
FIG. 2 is another block diagram of the microgrid.

In the received power $P_{RCV}$, a forward flow (FIG. 1: the flow of electricity from the power system 1 to the microgrid S1) is set to "positive", and a reverse flow (FIG. 2: the flow of electricity from the microgrid S1 to the power system 1) is set to "negative".

The control device 50 includes a CPU 51 that is an arithmetic unit and a memory 53 that is a storage. The memory 53 stores a program predicting supply and demand of the power of the microgrid S1 and a program calculating a target value of the received power $P_{RCV}$ optimizing energy use efficiency of the microgrid S1. Data necessary for performing the supply and demand prediction and data necessary for calculating the target value of the received power $P_{RCV}$ optimizing the energy use efficiency are stored. The CPU 51 calculates the target value of the received power $P_{RCV}$ optimizing the energy use efficiency of the microgrid S1 based on the supply and demand prediction of the power of the microgrid S1. Power control of the microgrid S1 is performed such that the received power $P_{RCV}$ of the microgrid S1 follows the target value. The control device 50 is an example of the energy management device.

The control device 50 can give a command to the bidirectional inverter circuit 31 to control switching between the forward conversion operation and the reverse conversion operation. The output of the bidirectional inverter circuit 31, namely, the output power Pinv can be controlled. The output power Pinv can be controlled by adjusting the output current Iinv.

The control device 50 can turning on and off the first converter circuit 21 to control connection and non-connection of the solar power generation panel 10 to and from the DC link unit 25. The connection and disconnection of the storage battery 15 with respect to the DC link unit 25 can be controlled by turning on and off the second converter circuit 23. The control device 50 can control switching between charge and discharge of the storage battery 15 through the second converter circuit 23. The output power of the storage battery 15 can be controlled through the second converter circuit 23. For example, the output power can be controlled by adjusting a current amount.

2. Supply and Demand Prediction of Power of Microgrid

The control device 50 predicts supply and demand of the power of the microgrid S1. Specifically, an electricity supply amount in the microgrid S1 (generated power of the distributed power supply) [kW] and an electricity demand amount in the microgrid S1 [kW] are predicted.

Because the microgrid S1 includes the solar power generation panel 10 as the distributed power supply, the generated power of the solar power generation panel 10 is the electricity supply amount of the microgrid S1. Because the microgrid S1 has the load L, power consumption $P_{LOAD}$ of the load L is the electricity demand amount.

Figure 3:
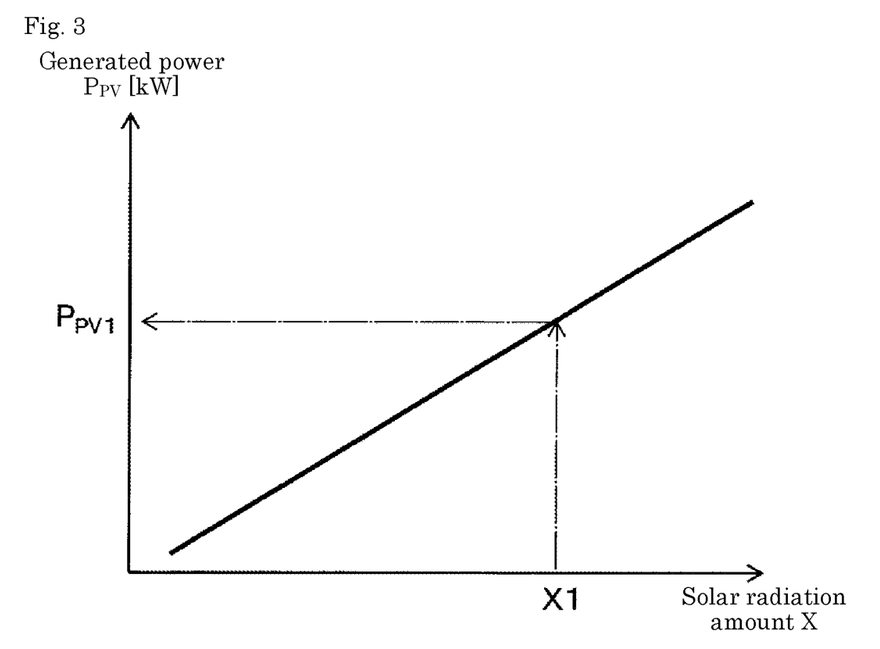
FIG. 3 is a graph illustrating a correlation characteristic between a solar radiation amount and generated power.

Generated power $P_{PV}$ of the solar power generation panel 10 has a correlation with a solar radiation amount X as illustrated in FIG. 3. The prediction value of the generated power $P_{PV}$ can be obtained from a prediction data providing spot 70 through a network NW. The prediction data providing spot 70 may be a provider by a providing spot of the power conditioner 20 or a providing spot of a power generation company. The generated power $P_{PV}$ of the solar power generation panel 10 is converted into the AC by the bidirectional inverter circuit 31. Conversion efficiency η is conversion efficiency of the inverter circuit 31 when the DC is converted into the AC.

The power consumption $P_{LOAD}$ of the load L can be predicted from past data. For example, the power consumption of the next day can be predicted by statistically processing the data of the power consumption $P_{LOAD}$ for several days.

The power consumption $P_{LOAD}$ of the load L can be obtained from the received power $P_{RCV}$ of the power receiving point 3 and the output power Pinv of the bidirectional inverter circuit 31. In the case of the forward current ($P_{RCV}>0$), the power consumption $P_{LOAD}$ of the load L is a sum of the output power Pinv and the received power $P_{RCV}$. In the case of the reverse power flow ($P_{RCV}<0$), the power consumption $P_{LOAD}$ of the load L is a difference between the output power Pinv and the received power $P_{RCV}$.

$$P_{LOAD} = Pinv + P_{RCV} \quad (A)$$

$$P_{LOAD} = Pinv - P_{RCV} \quad (B)$$

Figure 4:
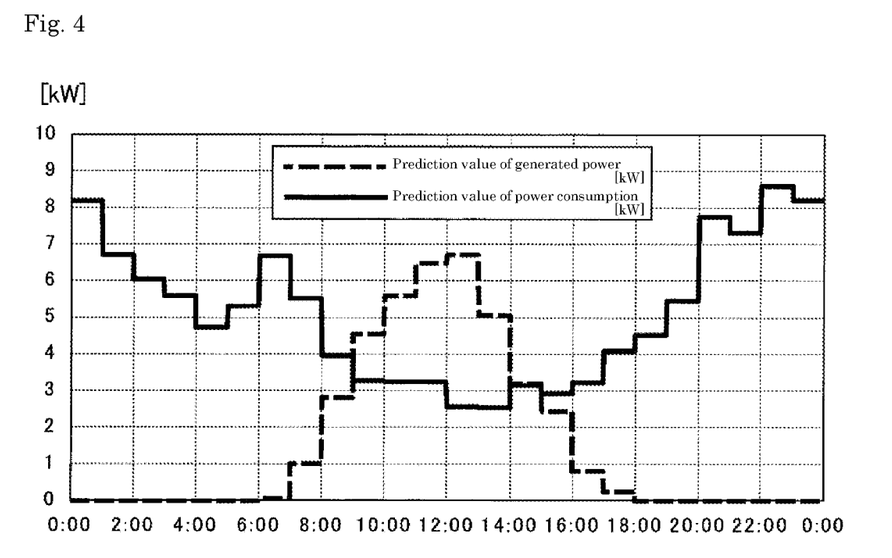
FIG. 4 is a graph illustrating transitions of a prediction value of generated power and a prediction value of power consumption.

FIG. 4 is a graph illustrating a supply and demand prediction result of the power of the microgrid S1. A broken line is the prediction value of the generated power of the microgrid S1, and a solid line is the prediction value of the power consumption of the microgrid S1. In this example, the power supply and demand prediction is performed every hour with a prediction target period T as one day, and the prediction value is a stepwise waveform in which the value changes every hour. The supply and demand prediction of the power of the microgrid S1 may be performed by the control device 50, or the data predicted by another device may be obtained.

Figure 5:
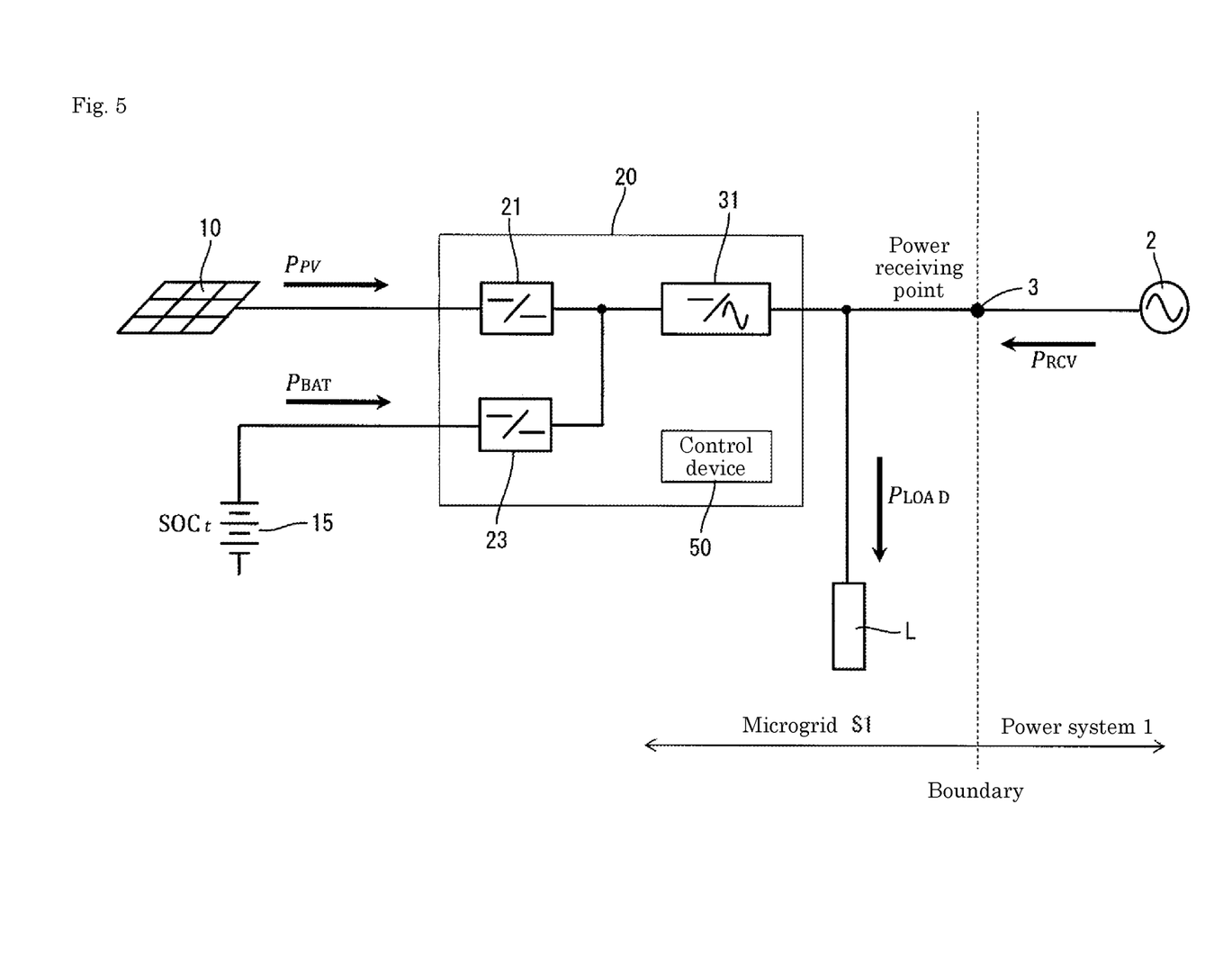
FIG. 5 is a simplified block diagram of the microgrid.

3. Optimization of Receiving Power Target Value Based on Supply and Demand Prediction of Power FIG. 5 is a simple block diagram of the microgrid S1. The CPU 51 of the control device 50 calculates a target value (hereinafter, referred to as a received power target value $P_{RCVreft}$) of the received power $P_{RCV}$ optimizing the energy use efficiency of the microgrid S1 based on the power supply and demand prediction (FIG. 4) of the microgrid S1.

An equation 1 is an objective function evaluating the energy use efficiency of the microgrid S1.

$$F = \sum_{t \in T} \{k_1 \cdot T_{MAX}(P_{RCVref\,t}, P_{PV\,t}, P_{LOAD\,t}) + \quad \text{[Mathematical formula 1]}$$
$$k_2 \cdot T_{MIN}(P_{RCVref\,t}, P_{PV\,t}, P_{LOAD\,t}) +$$
$$k_3 \cdot P_{RCV}(P_{RCVref\,t}, P_{PV\,t}, P_{LOAD\,t})\} + k_4 \cdot P_{PEAK}$$

A first term and a second term of the objective function F are terms evaluating the use-restricted period of the storage battery 15. A third term and a fourth term are terms evaluating the electricity rate of the microgrid S1.

The use-restricted period includes two periods including a charge-restricted period $T_{MAX}$ and a discharge-restricted period $T_{MIN}$. The charge-restricted period $T_{MAX}$ is a period during which the charge is restricted, and for example, is the case where a state of charge SOC of the storage battery 15 is located at the upper limit of the use range (in the case of full charge). The discharge-restricted period $T_{MIN}$ is a period during which the discharge is restricted, and for example, is the case where the state of charge SOC of the storage battery 15 is located at a lower limit of the use range.

In this example, $k_1 > k_2 > k_3 > k_4$ is satisfied, and the evaluation of the use-restricted period of the storage battery 15 is prioritized in the evaluation of the energy use efficiency of the microgrid S1. $k_1 = k_2$ and $k_3 = k_4$ may be satisfied.

When the arithmetic calculation optimizing a received power target value $P_{RCVreft}$ is performed, there are two conditions of an upper limit and a lower limit (an equation 2) of the received power target value $P_{RCVreft}$ and an upper limit and a lower limit (an equation 3) of the output power [kW] of the storage battery 15 as constraint conditions.

$$-P_{CSCAP} \leq P_{RCVref\,t} \leq P_{PCSCAP} (t \in T) \quad \text{[Mathematical formula 2]}$$

$$-P_{BATCAP} \leq (P_{LOAD\,t} - P_{RCVref\,t} - P_{PV\,t} \cdot \eta) \leq P_{BATCAP} (t \in T) \quad \text{[Mathematical formula 3]}$$

TABLE 1

| | |
|---|---|
| T | Set of total time section t (prediction target period) |
| $T_{MAX}(P_{RCVref\,t}, P_{PV\,t}, P_{LOAD\,t})$ | Charge-restricted period in time section t |
| $T_{MIN}(P_{RCVref\,t}, P_{PV\,t}, P_{LOAD\,t})$ | Discharge-restricted period in time section t |
| $P_{RCV}(P_{RCVref\,t}, P_{PV\,t}, P_{LOAD\,t})$ | Received power estimated value in time section t [kW] |
| $P_{PEAK}$ | Received power peak value of prediction target period T [kW] |
| $k_1 \sim k_4$ | Weighting factor |
| $P_{RCVref\,t}$ | Received power target value in time section t [kW] |
| $P_{PV\,t}$ | Generation power prediction value of PV panel in time section t [kW] |
| $P_{LOAD\,t}$ | Power consumption prediction value of load in time section t [kW] |
| $P_{PCSCAP}$ | Power conditioner rated capacity [kW] |
| $\eta$ | Conversion efficiency [%] |
| $P_{BATCAP}$ | Storage battery rated charge-discharge power [kW] |

The state-of-charge SOC is a ratio of a charge amount to a rated capacity of the storage battery 15. In order to calculate the objective function F, the state of charge SOC of the storage battery 15 is required to be estimated. A method of simulating the state of charge SOC of the storage battery 15 and the estimated value of received power $P_{RCVt}$ will be described below.

A method for calculating the charge-restricted period $T_{MAX}$ and discharge-restricted period $T_{MIN}$ in a time section t will be described.

<Step 1>

A provisional output power prediction value $P_{BATtmp\,t}$ of the storage battery 15 at the time section t is calculated from an equation 4 and an equation 5.

$$0 \leq (P_{LOAD\,t} - P_{RCVref\,t} - P_{PV\,t} \cdot \eta) \leq \quad \text{[Mathematical formula 4]}$$
$$P_{BATCAP} \ldots \text{(during discharge)}$$

$$P_{BATtmp\,t} = \frac{(P_{LOAD\,t} - P_{RCVref\,t})}{\eta} - P_{PV\,t}$$

$$-P_{BATCAP} \leq (P_{LOAD\,t} - P_{RCVref\,t} - P_{PV\,t} \cdot \eta) < 0 \ldots \text{(during charge)} \, P_{BATtmp\,t} = (P_{LOAD\,t} - P_{RCVref\,t}) \cdot \eta - P_{PV\,t} \quad \text{[Mathematical formula 5]}$$

<Step 2>

From an equation 6 to an equation 9, a provisional state-of-charge prediction value $SOC_{tmp\,t}$ of the storage battery 15 in the time section t is calculated.

(a) In the Case of t=0

$$Wh_{BAT\,0} = SOC_{INI} \times BATCAP \quad \text{[Mathematical formula 6]}$$

$$Wh_{BATtmp\,t} = Wh_{BAT\,0} - P_{BATtmp\,t} \times \text{hour} \quad \text{[Mathematical formula 7]}$$

(b) In the Case of t≠0

$$Wh_{BATtmp\,t} = Wh_{BAT\,t-1} - P_{BATtmp\,t} \times \text{hour} \quad \text{[Mathematical formula 8]}$$

$$SOC_{tmp\,t} = \frac{Wh_{BATtmp\,t}}{BATCAP} \times 100 \quad \text{[Mathematical formula 9]}$$

<Step 3>

The presence or absence of deviation from the upper and lower limits in the time section t is determined, and the state-of-charge prediction value $SOC_t$ of the storage battery 15, the output power $P_{BAT\,t}$ of the storage battery 15, the charge-restricted period $T_{MAX}$, and the discharge-restricted period $T_{MIN}$ are determined.

(a) In the Case of $SOC_{tmpt} \geq SOCMAX$ $$T_{MAX}(P_{RCVref\,t}, P_{PV\,t}, P_{LOAD\,t}) = 1, T_{MIN}(P_{RCVref\,t}, P_{PV\,t}, P_{LOAD\,t}) = 0 \quad \text{[Mathematical formula 10]}$$

$$P_{BAT\,t} = (SOC_{tmp\,t-1} - SOCMAX) \times BATCAP \quad \text{[Mathematical formula 11]}$$

(b) In the Case of $SOC_{tmpt} \leq SOCMIN$ $$T_{MAX}(P_{RCVref\,t}, P_{PV\,t}, P_{LOAD\,t}) = T_{MIN}(P_{RCVref\,t}, P_{PV\,t}, P_{LOAD\,t}) = 1 \quad \text{[Mathematical formula 12]}$$

$$P_{BAT\,t} = (SOC_{tmp\,t-1} - SOCMIN) \times BATCAP \quad \text{[Mathematical formula 13]}$$

(c) In the Case of $SOCMIN < SOC_{tmpt} < SOCMAX$ $$T_{MAX}(P_{RCVref\,t}, P_{PV\,t}, P_{LOAD\,t}) = 0, T_{MIN}(P_{RCVref\,t}, P_{PV\,t}, P_{LOAD\,t}) = 0 \quad \text{[Mathematical formula 14]}$$

$$P_{BAT\,t} = P_{BATtmp\,t} \quad \text{[Mathematical formula 15]}$$

Subsequently, an initial value (in the case of t=0) of the charge amount prediction value $Wh_{BATt}$ of the storage battery 15 can be obtained from equations 16, 17.

$$Wh_{BAT\,0} = SOC_{INI} \times BATCAP \quad \text{[Mathematical formula 16]}$$

$$Wh_{BAT\,t} = Wh_{BAT\,0} - P_{BAT\,t} \times \text{hour} \quad \text{[Mathematical formula 17]}$$

Subsequently, the charge amount prediction value $Wh_{BAT\,t}$ of the storage battery 15 can be obtained for each time section (when t≠0) by an equation 18. The prediction value $SOC_t$ of the state of charge SOC of the storage battery 15 can be obtained from an equation 19.

$$Wh_{BATtmp\,t} = Wh_{BAT\,t-1} - P_{BAT\,t} \times \text{hour} \quad \text{[Mathematical formula 18]}$$

$$SOC_t = \frac{Wh_{BAT\,t}}{BATCAP} \times 100 \quad \text{[Mathematical formula 19]}$$

The received power prediction value $P_{RCV}$ at the time section t can be calculated from equations 20, 21.

$$(P_{PV\,t} + P_{BAT\,t}) \geq 0 \ldots \quad \text{[Mathematical formula 20]}$$
(during power conditioner inverse conversion)

$$P_{RCV}(P_{RCVref\,t}, P_{PV\,t}, P_{LOAD\,t}) = P_{LOAD\,t} - (P_{PV\,t} + P_{BAT\,t}) \cdot \eta$$

$$(P_{PV\,t} + P_{BAT\,t}) < \quad \text{[Mathematical formula 21]}$$

0 ... (during power conditioner conversion)

$$P_{RCV}(P_{RCVref\,t}, P_{PV\,t}, P_{LOAD\,t}) = P_{LOAD\,t} - \frac{(P_{PV\,t} + P_{BAT\,t})}{\eta}$$

A receiving power peak prediction value $P_{PEAK}$ in the prediction target period T can be calculated from an equation 22.

$$P_{PEAK} = P_{RCV}(P_{RCVref\ t}, P_{PV\ t}, P_{LOAD\ t}) \text{ if}$$
$$P_{PEAK\_old} \leq P_{RCV}(P_{RCVref\ t}, P_{PV\ t}, P_{LOAD\ t}) \text{ (however, at } t=0, P_{PEAK\_old} = P_{PEAK\ INI}) \quad \text{[Mathematical formula 22]}$$

TABLE 2

| | |
|---|---|
| $P_{BATmp\ t}$ | Provisional output power prediction value of storage battery in time section t [kW] |
| $Wh_{BAT\ t-1}$ | Storage battery charge amount in previous time section t − 1 [kWh] |
| $Wh_{BATmp\ t}$ | Provisional charge amount prediction value of storage battery in time section t [kWh] |
| $SOC_{INI}$ | Storage battery charge state initial value in prediction target period T [%] |
| BATCAP | Storage battery rated capacity [kWh] |
| hour | Pitch width [h] |
| $SOC_{tmp\ t}$ | Provisional charge state prediction value of storage battery in time section t [%] |
| SOCMAX | Storage battery charge state upper limit [%] |
| SOCMIN | Storage battery charge state lower limit [%] |
| $P_{BAT\ t}$ | Storage battery output power prediction value in time section t [kw] |
| $Wh_{BAT\ t}$ | Storage battery charge amount prediction value in time section t [kwh] |
| $SOC_t$ | Storage battery charge state prediction value in time section t [%] |
| $P_{PEAK\_old}$ | Peak power until previous time section t − 1 in prediction target period T [kw] |
| $P_{PEAK\ INI}$ | Peak power initial value in prediction target period T [kW] |

From equations 4 to 19, when the received power target value $P_{RCVref}$ is determined with respect to a generated power prediction value $P_{PVt}$ and a power consumption prediction value $P_{LOADt}$ of the load L, a state of charge $SOC_t$ of the storage battery 15 can be estimated.

In each time section t, the control device 50 estimates the state of charge $SOC_t$ of the storage battery 15 using the received power target value $P_{RCVref}$ as a variable, and calculates four terms of the objective function F from the result.

Such an operation is performed (twenty-four cycles are executed when the prediction target period T is one day and when the arithmetic cycle is one hour) in the prediction target period T. Then, when the values of the objective function F are compared to each other with respect to the pattern of the combination of the received power target values $P_{RCVref}$, the combination of the received power target values minimizing the objective function F, namely, the received power target value $P_{RCVref}$ of each time section t can be determined for the prediction target period T.

Figure 6:
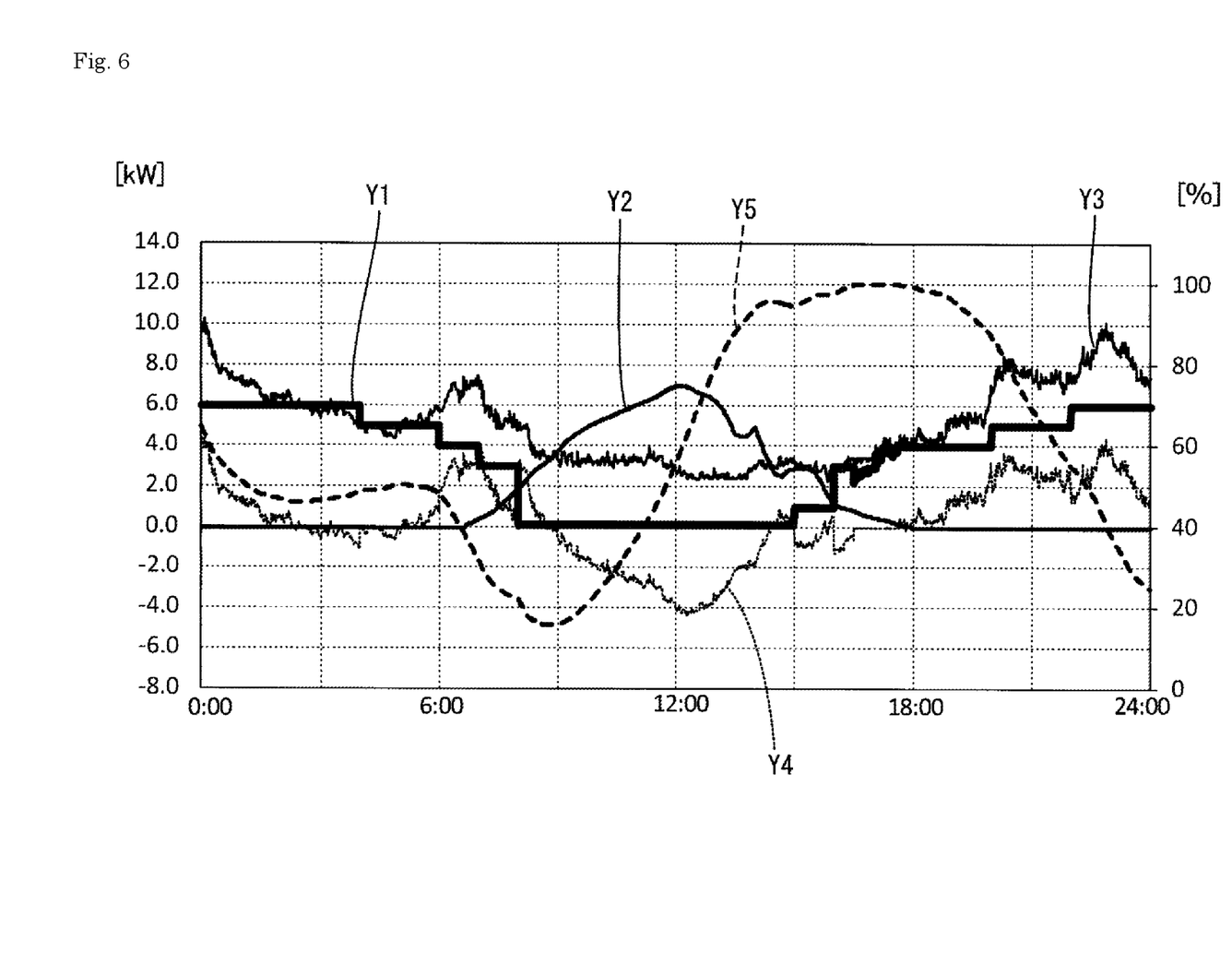
FIG. 6 is a graph illustrating a transition of a state of charge of a storage battery.
Figure 7:
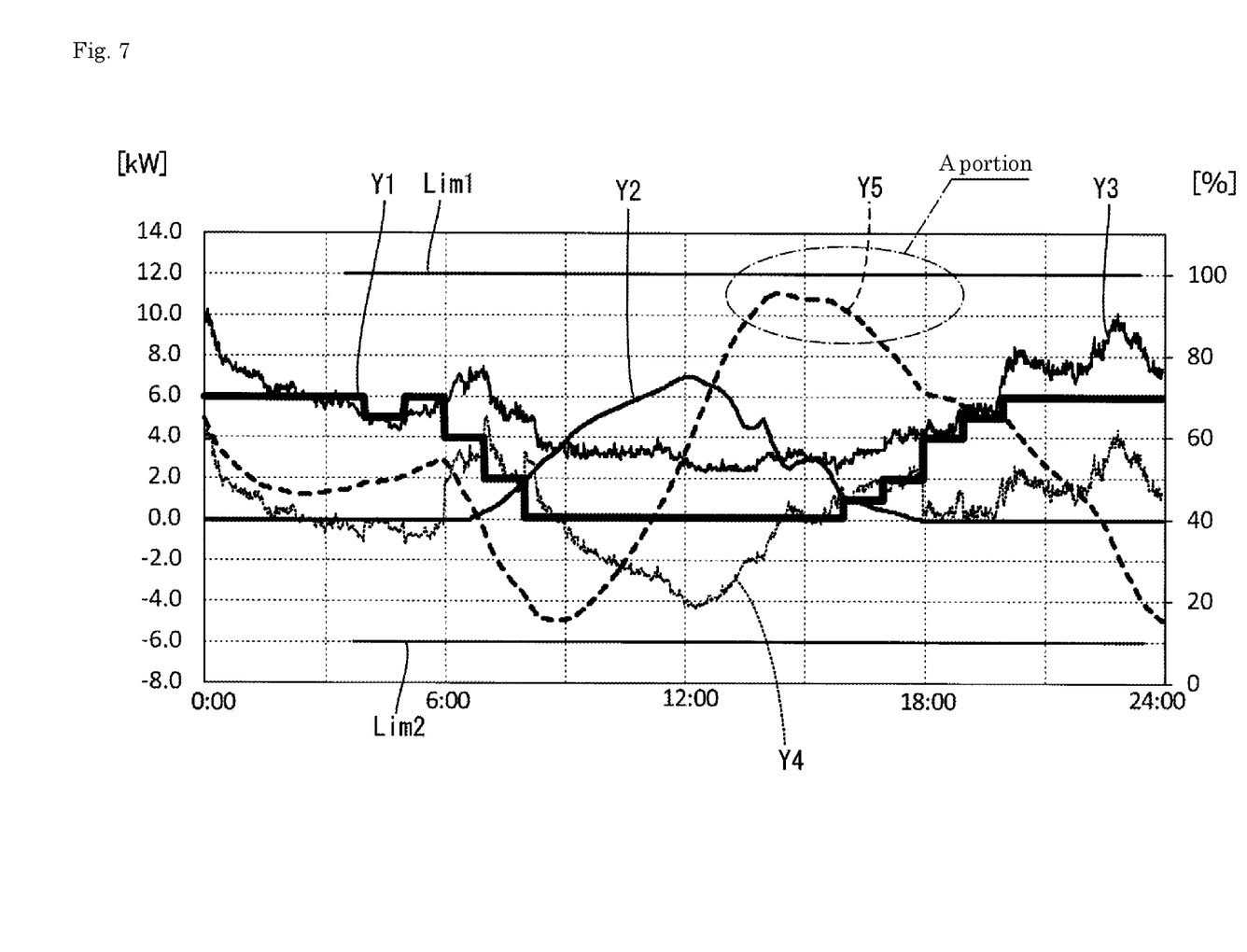
FIG. 7 is a graph illustrating the transition of the state of charge of the storage battery.

FIGS. 6 and 7 are graphs in which a horizontal axis represents time [h], a left vertical axis represents power [kW], and a right vertical axis represents a state of charge [%]. Y1 (bold line) indicates a transition of the received power [kW], and Y2 indicates a transition of the generated power [kW]. Y3 represents a transition of the power consumption [kW] of the load, Y4 represents a transition of the output power [kW] of the storage battery, and Y5 (broken line) represents a transition of the state of charge [%] of the storage battery 15.

FIG. 6 illustrates the case where the received power target value $P_{RCVref}$ is determined by an empirical rule, and FIG. 7 illustrates the case where the received power target value $P_{RCVref}$ is determined based on the objective function F.

When the received power target value $P_{RCVref}$ is determined by the empirical rule (FIG. 6), the state of charge SOC of the storage battery 15 is maintained around 100 [%] in the time zone of 16:00 to 18:00. For this reason, the storage battery 15 is required to restrict acceptance of the charge in the time zone of 16:00 to 18:00.

When the received power target value $P_{RCVref}$ is determined based on the objective function F (FIG. 7), the state of charge SOC of the storage battery 15 changes with a margin with respect to an SOC upper limit line Lim1 (SOC=100 [%]) and an SOC lower limit line Lim2 (SOC=10 [%]), and both the charge and the discharge are always possible. That is, when the received power target value $P_{RCVref}$ is compared with the case of the empirical rule, the state of charge SOC is suppressed to be low in the time zone (A portion) of 16:00 to 18:00, and the point that the charge in this time zone is not limited is improved.

4. Power Control of Microgrid

The CPU 51 of the control device 50 controls the power of the microgrid S1 such that the received power $P_{RCV}$ of the microgrid S1 follows the received power target value $P_{RCVref}$ calculated using the objective function F.

For example, when a measurement value of the received power $P_{RCV}$ is lower than the received power target value $P_{RCVref}$ during the forward flow in the power receiving point 3 and the reverse conversion operation in the inverter circuit 31, the output power of the storage battery 15 is narrowed to reduce the difference between the measurement value of the received power $P_{RCV}$ and the received power target value $P_{RCVref}$. When the measurement value of the received power $P_{RCV}$ is higher than the received power target value $P_{RCVref}$, the difference between the measurement value of the received power $P_{RCV}$ and the received power target value $P_{RCVref}$ is reduced by increasing the output power of the storage battery 15.

As described above, the received power $P_{RCV}$ of the microgrid S1 can follow the received power target value $P_{RCVref}$ calculated using the objective function F by adjusting the output of the storage battery 15 according to the difference between the measurement value of the received power $P_{RCV}$ and the target value.

5. Effects

The storage battery 15 compensates for the shortage of the power by charging the surplus power of the microgrid S1 and discharging the surplus power during the shortage of the power. When the use of the storage battery 15 is restricted, the surplus power cannot be stored and the energy is lost, so that the energy use efficiency of the microgrid S1 decreases.

In this configuration, the use-restricted period of the storage battery 15 can be minimized by obtaining the optimum value of the received power target value $P_{RCVref}$ based on the objective function F. Thus, the energy use efficiency of the microgrid S1 can be optimized from the viewpoint of the use efficiency of the storage battery 15.

When the use-restricted period of the storage battery 15 is the minimum, it is possible to flexibly cope with a demand response (DR). That is, because the state of charge SOC of the storage battery 15 has the margin with respect to the upper and lower limits, both a raising DR and a lowering DR can be coped with.

The raising DR is a request for increasing the demand of electricity. The storage battery 15 is charged and used as the load, so that the raising DR can be coped with. The lowering DR is a request for increasing the supply of electricity. The storage battery 15 is discharged and used as a power supply, so that the lowering DR can be coped with.

Second Embodiment

In order to determine the optimum value of the received power target value $P_{RCVref}$, the state of charge SOC and the like of the storage battery 15 are required to be estimated by the number of candidates of the received power target value $P_{RCVreft}$ for each time section t of the prediction target period T, and each term of the objective function F is required to be calculated. For example, in the case where the prediction target period T is one day and the number of time sections is twenty-four, when the received power target value $P_{RCVreft}$ is changed in the range of 0 to 10 [kW] in increments of 1 [kW], the total number of candidates of the received power target value $P_{RCVreft}$ is $11^{24}=9.85 \times 10^{24}$, and the arithmetic load increases in proportion to the total number of candidates.

In a second embodiment, the arithmetic load is reduced using the following two methods.
(A) Constraint on change width of received power target value
(B) Division of prediction target period T
(A) Will be Described.

Because there is a possibility that the change in the received power $P_{RCV}$ affects the power quality of the power system 1, desirably the change width is as small as possible. For this reason, as illustrated in an equation 23, the constraint is provided on the change width of the received power target value $P_{RCVreft}$ per time section t.

$$-\Delta P_{RCVref} \leq (P_{RCVref\,t} - P_{RCVref\,t-1}) \leq \Delta P_{RCVref} (t \in T)$$
$\Delta P_{RCVref}$: Change width maximum value of received power target value[kW]    [Mathematical formula 23]

Figure 8A:
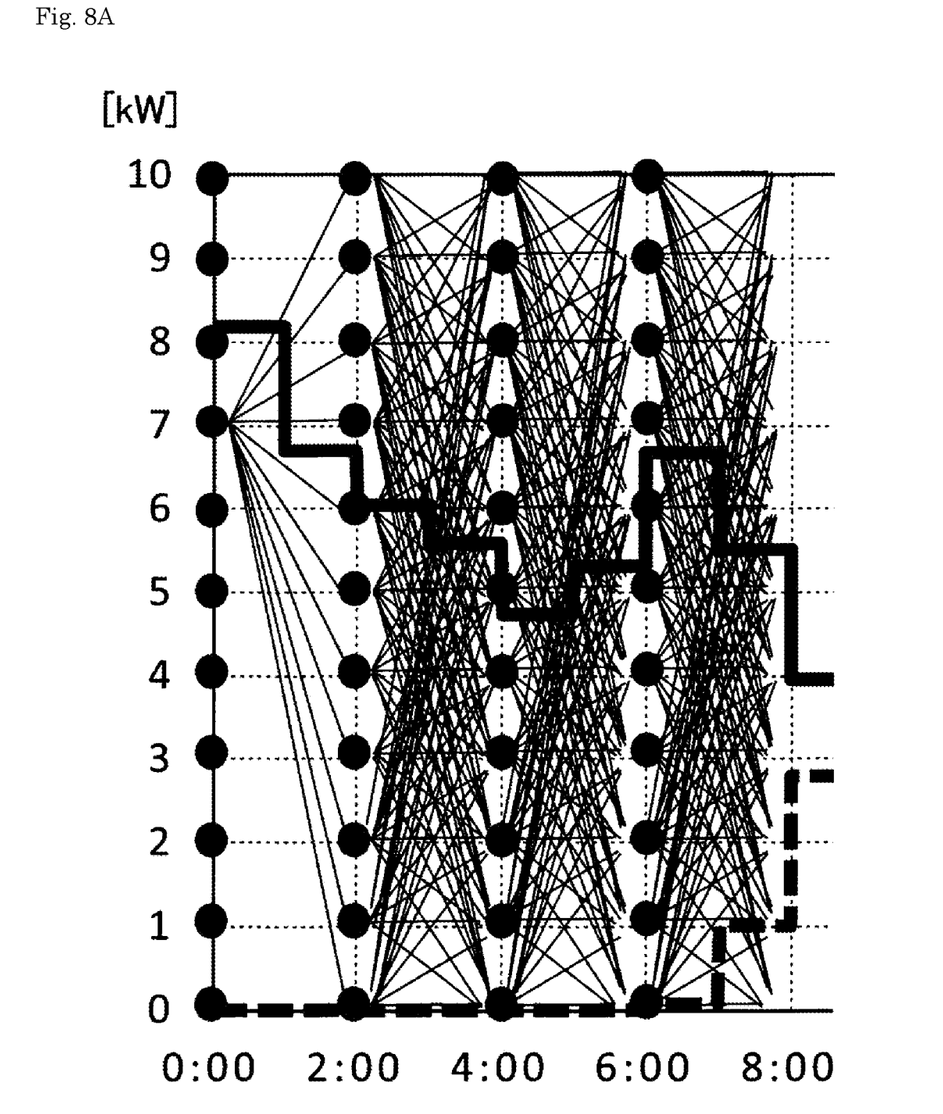
FIG. 8A is a view illustrating the number of candidates of received power.
Figure 8B:
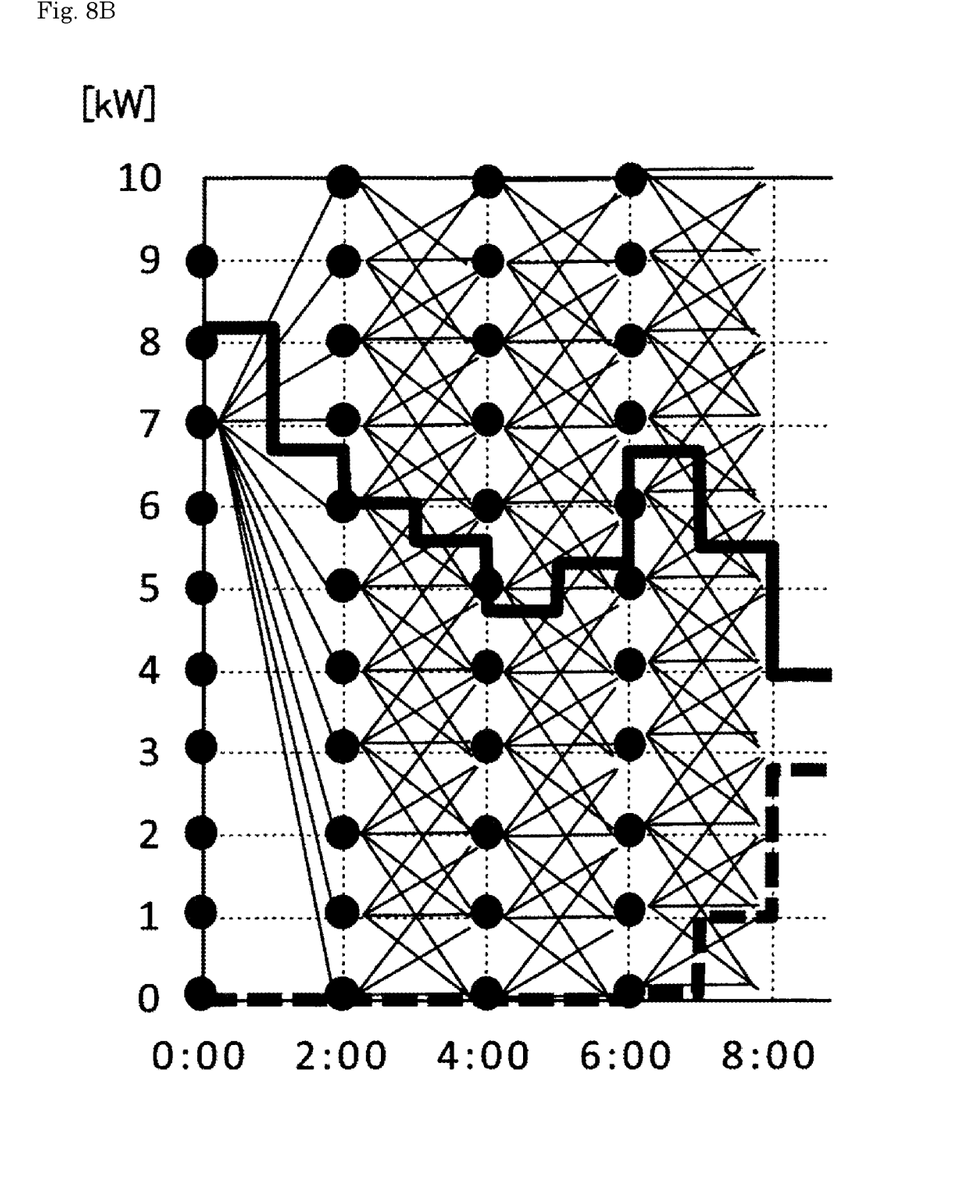
FIG. 8B is a view illustrating the number of candidates of the received power.

FIGS. 8A and 8B are views illustrating a combination of candidates of the received power target value $P_{RCVreft}$. FIG. 8A illustrates the case where the constraint is not provided on the change width of the received power target value $P_{RCVreft}$, and FIG. 8B illustrates the case where the maximum value of the change width of the received power target value $P_{RCVreft}$ is set to ±2 [kW].

The number of candidates of the received power target value $P_{RCVreft}$ per time section t is "11" when the constraint is not provided on the change width of the received power target value $P_{RCVreft}$ (in the case of FIG. 8A). On the other hand, the number of candidates of the received power target value $P_{RCVreft}$ per time section t is "4" when the maximum value of the change width of the received power target value $P_{RCVreft}$ is set to ±2 [kW] (in the case of FIG. 8B).

In this way, the constraint is provided on the change width of the received power target value $P_{RCVreft}$, so that the number of candidates of the received power target value $P_{RCVreft}$ per time section t can be reduced to greatly reduce the arithmetic load. The influence on the power system 1 can be reduced, and the quality of electricity can be maintained.
(B) Will be Described.

The prediction target period T is divided into a plurality of sections ΔT. Then, each divided section ΔT is set to one prediction target period, and an optimum value of the received power target value $P_{RCVreft}$ of each time section t is determined using the objective function F.

Figure 9:
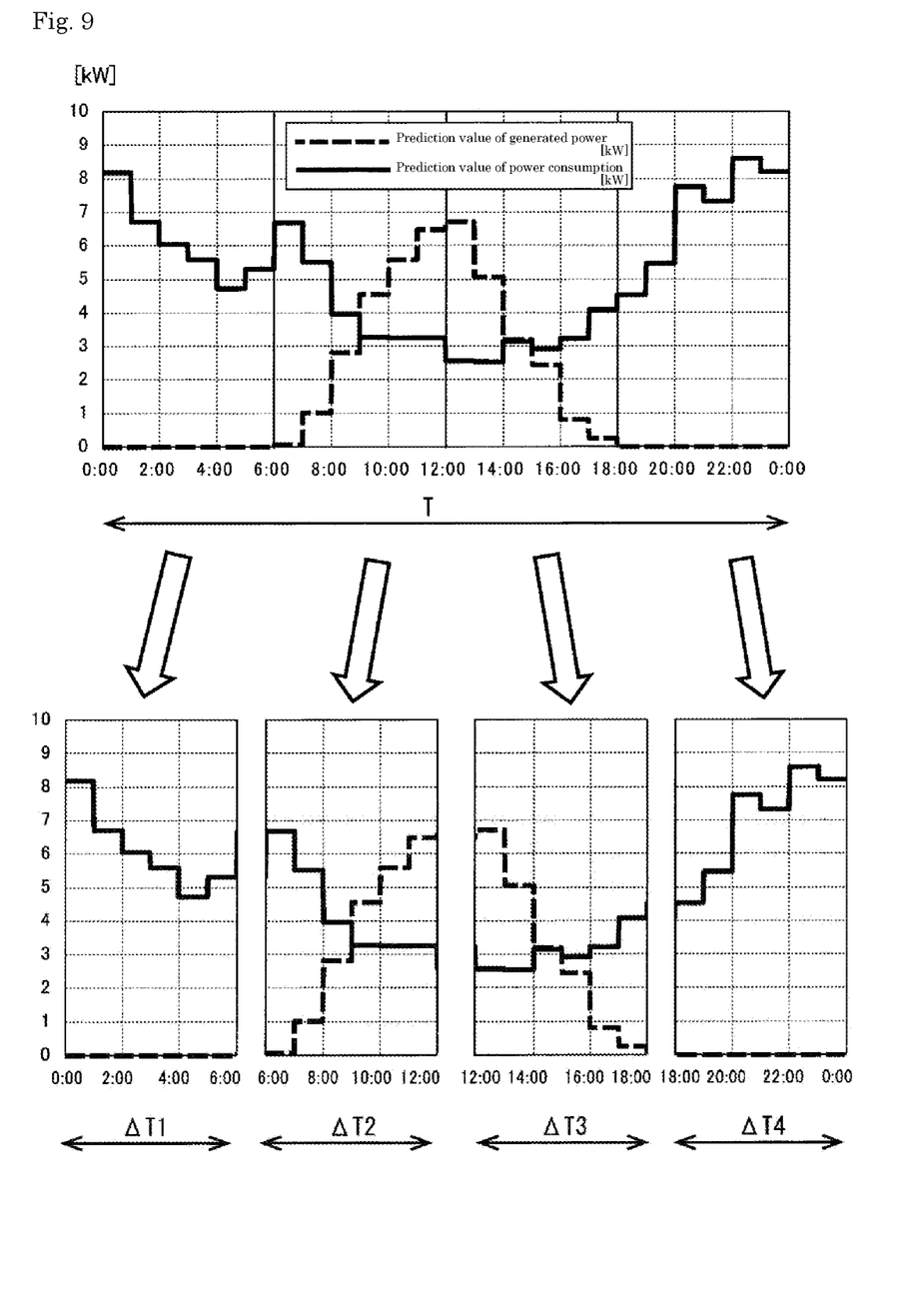
FIG. 9 is a view illustrating an example of division of a prediction target period.

For example, when the prediction target period T is one day, the prediction target period T is divided into four sections ΔT of ΔT1 to ΔT4 as illustrated in FIG. 9. Then, the arithmetic calculation optimizing the received power target value $P_{RCVreft}$ is performed using the objective function F with each section ΔT as one prediction target period.

In this case, the received power target value $P_{RCVreft}$ in the entire prediction target period T is obtained by connecting the received power target values $P_{RCVreft}$ of the respective time sections t of the respective sections ΔT determined as the optimum values in time series.

When the prediction target section T is divided, the received power target value $P_{RCVreft}$ of the entire prediction target period T is calculated in a plurality of times. Thus, the number of combinations of candidates of the received power target value $P_{RCVreft}$ per one time is reduced, so that the arithmetic load can be greatly reduced.

The number of divisions N of the prediction target period T may be other than four, such as three divisions. The number of time sections of each section ΔT may or may not be the same. Each section ΔT may be longer than the cycle of the supply and demand prediction. In the example of FIG. 9, ΔT=6 hours and the cycle of the supply and demand prediction=1 hour.

OTHER EMBODIMENTS

The present invention is not limited to the embodiments described with reference to the above description and the drawings. For example, the following embodiments are also included in the technical scope of the present invention.

(1) In the first embodiment, the grid having the linear power line (trunk line) 5 is illustrated as an example of the microgrid S1. However, a grid having a circular power line (trunk line) may be used. A microgrid S2 in FIG. 10 includes a power line 100 having a circular shape. A solar power generation panel 110 and a wind power generator 120 are connected to the power line 100 through power converters 115, 125. A load 130 and a storage battery 140 are connected to the power line 100. The power line 100 of the microgrid S2 is connected to the power system 1 through the interconnection line 105.

Figure 10:
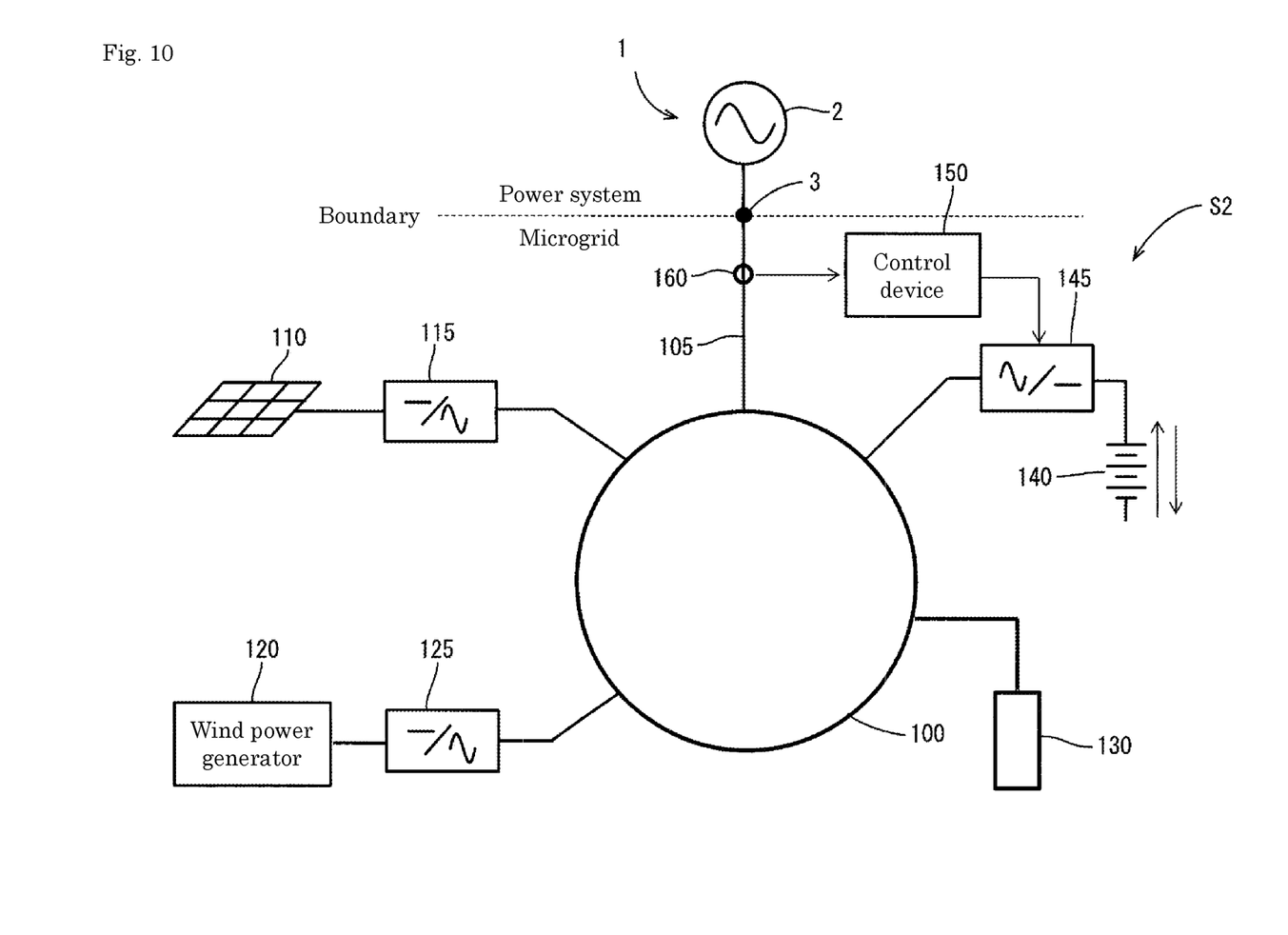
FIG. 10 is a block diagram of a microgrid.

The microgrid S2 includes a control device 150. The control device 150 calculates the received power target value $P_{RCVreft}$ optimizing the energy use efficiency of the microgrid S2 based on the supply and demand prediction of the microgrid S2. The control device 150 performs power control of the microgrid S2 such that the received power of the power receiving point 3 follows the calculated received power target value $P_{RCVreft}$. Specifically, the received power $P_{RCV}$ of the power receiving point 3 is monitored based on the output of the meter 160 provided at the power receiving point 3. When the difference exists with respect to the received power target value $P_{RCVreft}$, the control device 150 charges or discharges the storage battery 140 through the power converter 145 to reduce the difference. In this way, the received power $P_{RCV}$ can follow the calculated target value $P_{RCVreft}$, and the energy use efficiency of the microgrid S2 can be optimized. The control device 150 is an example of the "energy management device" of the present invention.

The microgrid S2 includes the solar power generation panel 10 and the wind power generator 120 as distributed power supply. When the supply and demand prediction of the microgrid S2 is performed, the power supply amount of the microgrid S2 may be set to a total value of the generated power of each distributed power supply. In the case of a plurality of loads, the power demand amount of the microgrid S2 may be a total value of the loads. The distributed power supply is a generic term for all small-scale power generation facilities dispersedly disposed adjacent to a demand site. For example, the distributed power supply may be a biomass power generator or the like in addition to the solar power generation panel 10 and the wind power generator 120. The distributed power supply may be a power source using renewable energy or a power source using fossil fuel.

(2) In the first embodiment, the objective function F includes four terms of the first term to the fourth term, and the four terms are multiplied by the weighting coefficients $k_1$ to $k_4$ and added. In the first embodiment, the magnitude relationship of the weighting factors is $k_1>k_2>k_3>k_4$. However, the magnitude relationship may be $k_3>k_4>k_1>k_2$. The electricity rate of the microgrid can be preferentially evaluated by reversing the magnitude relationship of the weighting factors, so that the energy use efficiency of the microgrid can be optimized from the viewpoint of the electricity rate. The objective function F may be only the first and second terms evaluating the use-restricted period of the storage battery 15, or may be only the third and fourth terms evaluating the electricity rate of the microgrid. The objective function F may be any other function as long as the function optimizes the energy utilization efficiency of the microgrid.

(3) In the first embodiment, the arithmetic calculation obtaining the optimum value of the received power target value $P_{RCVref}$ is performed by the control device 50 of the power conditioner 20. An arithmetic subject is not limited to the power conditioner 20, but may be an arithmetic device provided separately from the power conditioner 20. The arithmetic device is an example of the energy management device.

(4) In the first embodiment, the optimum value of the received power target value $P_{RCVref}$ is calculated using the objective function. However, for example, the optimum value of the received power target value $P_{RCVref}$ may be calculated using AI. Any method can be used when the target value of the received power of the microgrid optimizing the energy use efficiency of the microgrid based on the power supply and demand prediction in the microgrid, with the upper and lower limits of the received power of the microgrid and the upper and lower limits of the output power of the energy storage apparatus as constraint conditions. In the first embodiment, the storage battery is exemplified as the energy storage apparatus. However, the energy storage apparatus may be a capacitor or the like.

The invention claimed is:

1. A power control device for a microgrid that is interconnected to a power system via an external measuring instrument and includes an energy storage apparatus, the power control device comprising:
an energy management device configured for:
obtaining received power at the external measuring instrument that is external to the microgrid and positioned for detecting power and forward/reverse flow at a power receiving point, the power receiving point being a boundary portion between the power system and the microgrid, the power receiving point being external to a switch configured for interconnecting a bidirectional inverter circuit within the microgrid to the power system;
calculating a target value of the received power at the external measuring instrument, the target value of the received power at the external measuring instrument optimizing energy use efficiency of the microgrid based on a supply and demand prediction of power in the microgrid with upper and lower limits of received power of the microgrid and upper and lower limits of output power of the energy storage apparatus as constraint conditions; and
generating a signal that adjusts an output current of the bidirectional inverter circuit such that the received power follows the target value.

2. The power control device according to claim 1, wherein the energy use efficiency of the microgrid is evaluated using an objective function.

3. The power control device according to claim 2, wherein the objective function is a function evaluating a use-restricted period of the energy storage apparatus.

4. The power control device according to claim 2, wherein the objective function is a function evaluating an electricity rate of the microgrid.

5. The power control device according to claim 2, wherein the objective function is a function in which a term evaluating the use-restricted period of the energy storage apparatus and a term evaluating the electricity rate of the microgrid are added with weight.

6. The power control device according to claim 1, wherein a condition of a degree of change of the target value of the microgrid is added to the constraint condition.

7. The power control device according to claim 1, wherein a prediction target period of the target value is divided into a plurality of sections, and the target value of the received power optimizing the energy use efficiency of the microgrid for each of the divided sections is calculated.

8. The power control device according to claim 7, wherein the section is longer than a cycle of the supply and demand prediction.

9. An energy management method for a microgrid that is interconnected to a power system via an external measuring instrument and includes an energy storage apparatus, the energy management method comprising the steps of:
providing a power control device comprising an energy management device that obtains, at the external measuring instrument that is external to the microgrid and positioned for detecting power and forward/reverse flow at a power receiving point, received power of the microgrid, the power receiving point being a boundary portion between the power system and the microgrid, the power receiving point being external to a switch configured for interconnecting a bidirectional inverter circuit within the microgrid to the power system;
calculating, via the energy management device, a target value of the received power at the external measuring instrument, the target value of the received power at the external measuring instrument optimizing energy use efficiency of the microgrid based on a supply and demand prediction of power in the microgrid with upper and lower limits of received power of the microgrid and upper and lower limits of output power of the energy storage apparatus as constraint conditions; and
generating, via the energy management device, a signal that adjusts an output current of the bidirectional inverter circuit such that the received power follows the target value.

10. The method according to claim 9, wherein:
the energy use efficiency of the microgrid is evaluated using an objective function; and
one of:
the objective function is a function evaluating a use-restricted period of the energy storage apparatus;
the objective function is a function evaluating an electricity rate of the microgrid; or
the objective function is a function in which a term evaluating the use-restricted period of the energy storage apparatus and a term evaluating the electricity rate of the microgrid are added with weight.

11. The method according to claim 9, wherein a condition of a degree of change of the target value of the microgrid is added to the constraint condition.

12. The method according to claim 9, wherein a prediction target period of the target value is divided into a plurality of sections, and the target value of the received power optimizing the energy use efficiency of the microgrid for each of the divided sections is calculated.

13. A power conditioner comprising:
a first converter to which a distributed power supply is connected;
a second converter to which a storage battery is connected;
a bidirectional inverter circuit to which the first converter and the second converter are connected on one side thereof, and to which an external measuring instrument, that is external to the microgrid and positioned for detecting power at a power receiving point that is a boundary portion between a power system and a microgrid, is connected on another side thereof; and
a control device,
wherein the control device is configured for:
obtaining received power at the external measuring instrument that is external to the microgrid and positioned for detecting power and forward/reverse flow at the power receiving point, the power receiving point being external to a switch configured for interconnecting the bidirectional inverter circuit within the microgrid to the power system;
calculating a target value of the received power at the external measuring instrument, the target value of the received power at the external measuring instrument optimizing energy use efficiency of the microgrid based on a supply and demand prediction of power in the microgrid with upper and lower limits of received power of the microgrid and upper and lower limits of output power of the energy storage apparatus as constraint conditions, and
generating a signal that adjusts an output current of the bidirectional inverter circuit such that the received power follows the target value.

14. The power conditioner according to claim 13, wherein the energy use efficiency of the microgrid is evaluated using an objective function.

15. The power conditioner according to claim 14, wherein the objective function is a function evaluating a use-restricted period of the energy storage apparatus.

16. The power conditioner according to claim 14, wherein the objective function is a function evaluating an electricity rate of the microgrid.

17. The power conditioner according to claim 14, wherein the objective function is a function in which a term evaluating the use-restricted period of the energy storage apparatus and a term evaluating the electricity rate of the microgrid are added with weight.

18. The power conditioner according to claim 13, wherein a condition of a degree of change of the target value of the microgrid is added to the constraint condition.

19. The power conditioner according to claim 13, wherein a prediction target period of the target value is divided into a plurality of sections, and the target value of the received power optimizing the energy use efficiency of the microgrid for each of the divided sections is calculated.

20. The power conditioner according to claim 19, wherein the section is longer than a cycle of the supply and demand prediction.

* * * * *